United States Patent
Fujita et al.

(10) Patent No.: US 6,913,122 B2
(45) Date of Patent: Jul. 5, 2005

(54) BRAKE FOR DC MOTOR

(75) Inventors: Youichi Fujita, Tokyo (JP); Satoshi Kawamura, Tokyo (JP); Sotsuo Miyoshi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 41 days.

(21) Appl. No.: 10/416,890

(22) PCT Filed: Sep. 17, 2001

(86) PCT No.: PCT/JP01/08067

§ 371 (c)(1),
(2), (4) Date: May 16, 2003

(87) PCT Pub. No.: WO03/026123

PCT Pub. Date: Mar. 27, 2003

(65) Prior Publication Data

US 2004/0040798 A1 Mar. 4, 2004

(51) Int. Cl.[7] .............................................. F16D 65/36
(52) U.S. Cl. ........................ 188/156; 318/138; 318/439; 251/129.11
(58) Field of Search ....................... 251/129.05, 129.11; 188/156–164; 318/138, 254, 255–277, 371–377, 439, 463, 721–724

(56) References Cited

U.S. PATENT DOCUMENTS

| | | | | |
|---|---|---|---|---|
| 4,742,989 A | * | 5/1988 | Akagi | 251/129.05 |
| 4,816,987 A | * | 3/1989 | Brooks et al. | 700/45 |
| 5,029,597 A | * | 7/1991 | Leon | 137/1 |
| 5,682,089 A | * | 10/1997 | Bolte et al. | 318/439 |
| 5,847,530 A | * | 12/1998 | Hill | 318/599 |
| 6,051,943 A | * | 4/2000 | Rabin et al. | 318/254 |
| 6,435,169 B1 | * | 8/2002 | Vogt | 123/568.23 |

FOREIGN PATENT DOCUMENTS

JP      57-138882      8/1982

* cited by examiner

*Primary Examiner*—Chris Schwartz
(74) *Attorney, Agent, or Firm*—Sughrue Mion, PLLC

(57) ABSTRACT

A braking device of a DC motor has a position detecting means to detect a position of a motor shaft, a rotational speed detecting means to detect a rotational speed of the motor and a braking means to generate a braking force based on a position signal and a speed signal detected by both of the means, and stops the motor shaft quickly and smoothly without making the motor shaft collide with a stopper.

8 Claims, 7 Drawing Sheets

| STATE OF OPERATION OF MOTOR TERMINAL | | ROTATIONAL DIRECTION THAT GENERATES BRAKING TORQUE |
|---|---|---|
| (+) TERMINAL OF MOTOR | (-) TERMINAL OF MOTOR | |
| LOW | LOW | BOTH DIRECTIONS |
| HIGH | HIGH | BOTH DIRECTIONS |
| OFF | LOW | DIRECTION THAT CLOSES VALVE |
| HIGH | OFF | DIRECTION THAT CLOSES VALVE |
| OFF | HIGH | DIRECTION THAT OPENS VALVE |
| LOW | OFF | DIRECTION THAT OPENS VALVE |

BRAKE FOR DC MOTOR

TECHNICAL FIELD

The present invention relates to a braking device for a DC motor used as a driving source for driving and holding a driven body at a target position, for example, in a throttle valve, an actuator, an EGR valve and the like.

BACKGROUND ART

FIG. 1 is a cross sectional view to show a constitution of a current passing device of a DC motor. FIG. 2 illustrates a flow of current in the current passing device in FIG. 1. In the drawing is illustrated a longitudinal cross sectional view to show an EGR (Exhaust Gas Recirculation) valve means provided as a driving source. In FIG. 1, a reference numeral 1 denotes a valve body in which a passage communicating with an exhaust gas return passage c disposed in a recirculation system of an exhaust gas. When a control valve 11 is moved up as shown in the drawing, it is put into contact with a seat 12 to thereby close the exhaust gas return passage c and when the control valve 11 is moved down, it is separated from the seat 12 to thereby open the exhaust gas return passage c.

A reference numeral 21 denotes a DC motor to become a driving means (torque generating source) of the control valve for opening/closing an exhaust gas passage, 22 denotes a motor case mounted on the valve body 1, 23 denotes a rotor which is rotatably supported in the motor case 22 via bearings 24, 25, and the rotor 23 has a screw hole 23a made through a shaft central portion. A reference numeral 26 denotes a magnet mounted on the outer peripheral portion of the rotor 3, 27 denotes a stator core surrounding the outer periphery of the magnet 26, and a predetermined gap is formed between this stator core 27 and the above mentioned magnet 26.

A reference numeral 28 denotes a coil arranged in the stator core 27 and constituting a stator, 29 denotes a motor shaft to be a valve driving shaft, and this motor shaft 29 is made of a screw shaft and screwed into the screw hole 23a of the above mentioned rotor 23 and moved in an axial direction by a rotation of the above mentioned rotor 23.

A reference numeral 30 denotes a valve shaft abutting member which is integrally formed with the motor shaft 29. By making the top end of a valve shaft 13 having the above mentioned control valve 11 abut against the tip end (bottom end in FIG. 1) of the valve shaft abutting member 30, the valve shaft 13 is made to follow a movement in the axial direction of the above mentioned motor shaft 29 to thereby open/close the above mentioned control valve 11.

A reference numeral 31 denotes a cover mounted on an end surface on the valve shaft abutting member 30 side in the motor case 22, 32 denotes a spring retaining member mounted on the tip end side of the valve shaft abutting member 30, 33 denotes a spring which is hung between the spring retaining member 32 and the above mentioned cover 31 for urging the valve, and this spring 33 urges the control valve 11 at the tip end of the valve shaft via the valve shaft abutting member 30 in a direction that opens the control valve 11. A reference numeral 34 denotes a commutator rotating integrally with the rotor 23 and has a shaft hole 34a at a central portion. A reference numeral 14 denotes a spring receiver mounted on the top end of the valve shaft 13 and a return spring 18 is mounted between the spring receiver 14 and the valve body 1.

A reference numeral 35 denotes a power source side case mounted on an opening end portion on the commutator 34 side of the motor case 22. This power source side case 35 is an integrally molded part made of synthetic resin and constitutes a current passing device body of the DC motor 21 and is an integral combination of a built-in sensor portion 36 in which a position sensor (not shown) for detecting an opening of the above mentioned control valve is built and an input/output connector portion 37 in which a connector terminal is built.

A reference numeral 38 denotes a brush holding cylindrical portion integrally molded with a wall opposed to the commutator 34 in the power source side case 35, and 39 denotes a brush slidably inserted into the brush holding cylindrical portion 38, for passing a current. This brush 39 is made of carbon powder and copper powder and is connected to the connector terminal of the above mentioned input/output connector portion 37 via a lead wire (not shown).

Next, an operation will be described. Passing a current through the coil 28 via the brush 39 and the commutator 34 generates a rotational torque in the rotor 23 by an interaction between a magnetic field generated in the coil 28 and a magnetic field of the magnet 26. When the rotor 23 is rotated by the rotational torque, the motor shaft 29 screwed into the screw hole 23a of the rotor 23 is fed by the screw and moved straight in an axial direction.

Here, in a case where the motor shaft 29 is moved downward in FIG. 1, the valve shaft abutting member 30 is pushed by the motor shaft 29 in a direction of urging force of the spring 33 to thereby open the control valve 11 via the valve shaft 13 against which the valve shaft abutting member 30 abuts. Then, when the control valve 11 moves near to a target position and a difference between a present position and a target position becomes nearly equal to zero, an electric power required to hold the valve 11 at its position against the restoring force of the return spring 18 is supplied to the DC motor 21.

On the other hand, when the rotor 23 of the DC motor 21 is rotated in a direction opposite to the above mentioned direction, the motor shaft 29 is moved upward in FIG. 1 and the valve shaft 13 abutting against the valve shaft abutting member 30 which is made integrally with the motor shaft 29 follows to and moves with the motor shaft 29 against the restoring force of the return spring 18 to thereby close the valve.

FIG. 2 is a diagram of one example of a control circuit for supplying the DC motor 21 with a control signal. A reference numeral 41 denotes a position sensor (position detecting means) and the position sensor 41 has a movable contact portion 43 moving on a resistor 42 to which a constant voltage is applied by a power supply terminal and when the movable contact portion 43 moves with the rotation of the rotor 23, a voltage responsive to its movement position is outputted as a detection signal.

A reference numeral 44 denotes a controller block and the controller block 44 has an A/D input port 45 for inputting the detection signal from the valve position sensor 41, a filter 46 for reading an output of the A/D input port 45, a PI control computing section 48 for performing a PI control computation based on an output of the filter 46 and an output of a target value determining section 47, an excitation switching and duty computing section 49 for performing an excitation duty computation based on an output of the PI control computing section 48, a digital output port 50 for outputting an ON/OFF signal and a PWM output port 51 for outputting a PWM signal, on the basis of an output of the excitation switching and duty computing section 49, and an external operation input section 61.

A reference numeral 52 denotes a switching circuit for controlling the passing of a current through the DC motor 21. A (+) side end of the DC motor 21 is connected to a connection point of semiconductor switching devices (hereinafter referred to as switch device) 53, 54 connected in series and a (−) side end thereof is connected to a connection point of semiconductor switching devices (hereinafter referred to as switch device) 55, 56 connected in series.

To each of the above mentioned switch devices 53, 55 is connected each of transistors 57, 58 which are turned ON/OFF by an output of the digital output port 50, and to each of the above mentioned switch devices 54, 56 is connected each of transistors 59, 60 turned ON/OFF by an output of the PWM output port 51.

Next, an operation will be described.

When a target value is determined by the target value determining section 47, the PI control computing section 48 performs the PI control computation based on a present value which is detected by the position sensor 41 and inputted via the A/D input port 45 and the filter 46, and the above mentioned target value, and the excitation switching and based on the computation result duty computing section 49 performs the excitation duty computation.

The digital output port 50 outputs an ON signal to terminal a and terminal b based on the output of the excitation switching and duty computing section 49 to bring the switch device 53 into conduction via the transistor 57, for example, to thereby connect the (+) terminal of the DC motor 21 to a power applying terminal V. On the other hand, the PWM output port 51 outputs a PWM signal to the terminal a and terminal b based on the output of the excitation switching and duty computing section 49 to control a conduction of the switch device 56 via the transistor 60, for example, to thereby pass a current in a direction shown by a solid line arrow through the DC motor 21.

In this manner, the DC motor 21 is operated, the motor shaft 29 is moved down by the rotation of its rotor 23, and by this moving down motion, the valve shaft 13 is moved in the same direction against the return spring 18 to move the control valve 11 to a target position to thereby open the control valve 11. Then, when the control valve 11 moves near to the target position and a difference between the present value and the target value becomes nearly equal to zero, an electric power only required enough to hold the control valve 11 at its position against the restoring force of the return spring 18, is supplied to the DC motor 21.

Next, in the above mentioned state in which the valve is opened, when the outputs of the terminal a and terminal b of the digital output port 50 and the PWM output port 51 are reversed to bring the switch devices 54, 55 into conduction via the switch devices 58, 59, a current is passed through the DC motor 21 in a direction shown by a dotted line to rotate the rotor 23 of the DC motor 21 in a reverse direction. In this manner, the motor shaft 29 is moved upward in FIG. 1 and the valve shaft 13 follows this movement and is moved by the urging force of the return spring 18 to thereby move the control valve in a direction that closes the valve. Then, when the control valve 11 abuts against the seat 12 and is closed, the valve shaft 13 stops moving but the motor shaft 29 continues to move until the DC motor 21 stops and abuts against a stopper S and stops there.

Since a motor shaft in a conventional DC motor is constituted in such a way that it is made to abut against the stopper to be stopped as described above, a response of the DC motor varies depending on a kind of braking and a judgment for braking start. In particular, in a case of the DC motor having high response, there is presented a problem that the motor shaft collides with the stopper at a motor stop point to cause breakage because of an overshoot of the rotor.

The present invention has been made to solve the above mentioned problem, and an object of the present invention is to provide a braking device of the DC motor capable of reducing a collision of the motor shaft with a stopper at a motor stop point and stopping the motor shaft quickly.

DISCLOSURE OF THE INVENTION

A braking device of a DC motor in accordance with the present invention, in a DC motor of the type in which a motor shaft is made to abut against a stopper at a target position to be stopped and held, includes: a position detecting means to detect a position of the motor shaft; a rotational speed detecting means to detect a rotational speed of the motor; and a braking means to generate a braking force based on a position signal and a speed signal detected by said both of the means.

By this arrangement it is made possible to stop the above mentioned motor shaft quickly and smoothly without making it collide with the stopper.

In the braking device of a DC motor in accordance with the invention a regenerative braking is used at the braking means.

By this arrangement it is made possible to eliminate a need for providing a special braking means.

The braking device of a DC motor in accordance with the invention further includes a braking force varying means to vary the braking force.

By this arrangement it is made possible to perform a smooth braking of the motor.

In the braking device of a DC motor in accordance with the invention a PWM control is used at the varying means to vary the braking force.

By this arrangement it is made possible to perform a smooth braking of the motor.

In the braking device of a DC motor in accordance with the invention the braking force by the PWM control is increased when a rotational speed of the motor is high.

By this arrangement it is made possible to perform a smooth and stable braking of the motor.

In the braking device of a DC motor in accordance with the invention a position at a time of next computation is predicted by a present position of the motor shaft and a rotational speed and an acceleration of the motor and a start of braking is judged.

By this arrangement it is made possible to stop the above mentioned motor shaft quickly and smoothly without making it collide with the stopper.

In the braking device of a DC motor in accordance with the invention an amount of braking is determined by one or both of a rotational speed and a target position of the motor.

By this arrangement it is made possible to stop the above mentioned motor shaft quickly and smoothly without making it collide with the stopper.

In the braking device of a DC motor in accordance with the invention braking is stopped when the motor shaft goes over a target position.

By this arrangement it is made possible to stop the motor shaft at the target position stably.

In the braking device of a DC motor in accordance with the invention a braking start position can be varied.

By this arrangement it is made possible to begin starting of braking at the most suitable position.

In the braking device of a DC motor in accordance with the invention a start of braking is judged by a rotational speed and an acceleration of the motor.

By this arrangement it is made possible to stop a driven body quickly and smoothly by the above mentioned motor.

BEST MODE FOR CARRYING OUT THE INVENTION

In order to describe the present invention in more detail, best modes for carrying out the invention will be described below according to the accompanied drawings.

Embodiment 1

Figure 1:
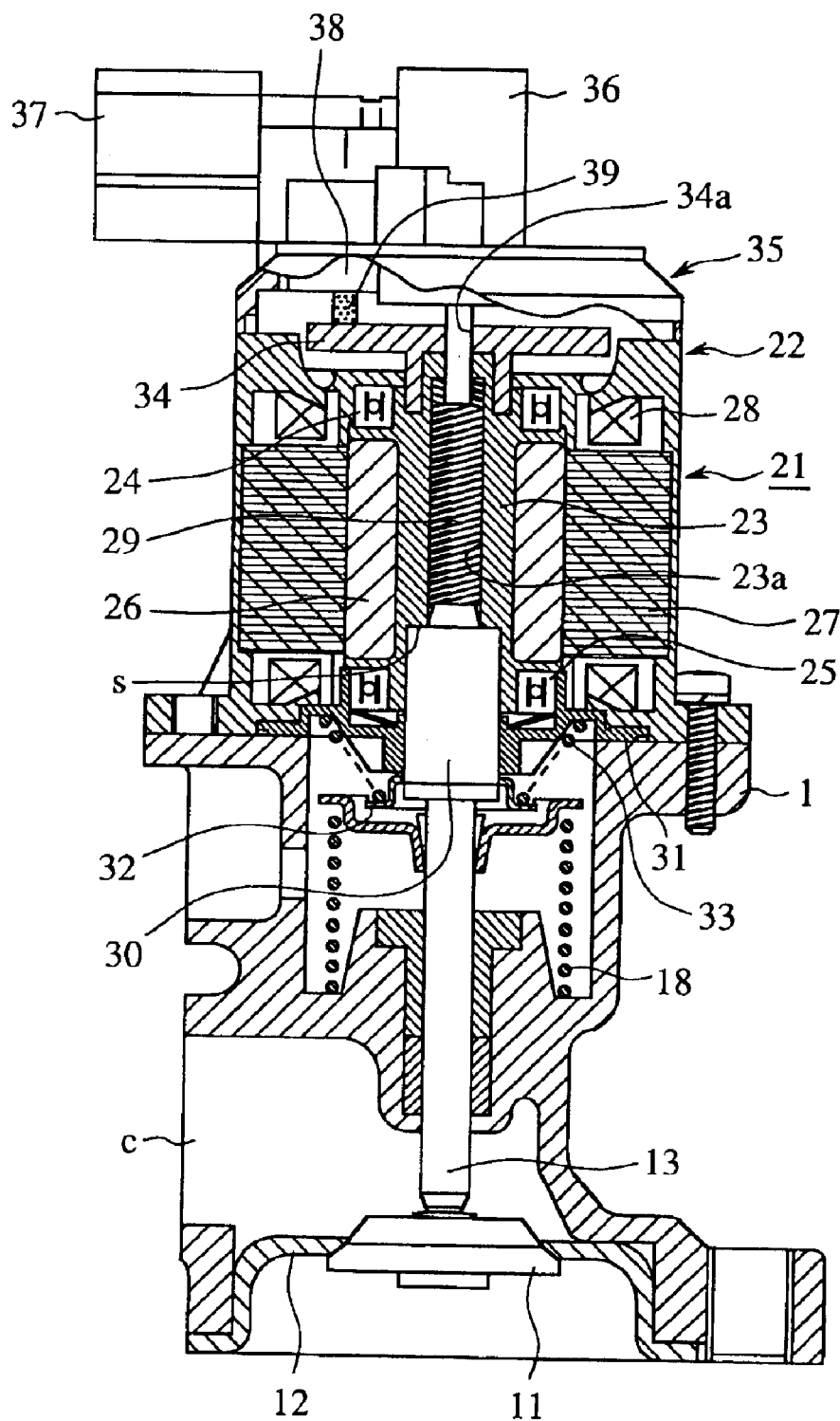
FIG. 1 is a longitudinal cross sectional view to show a constitution of an EGR valve.
Figure 2:
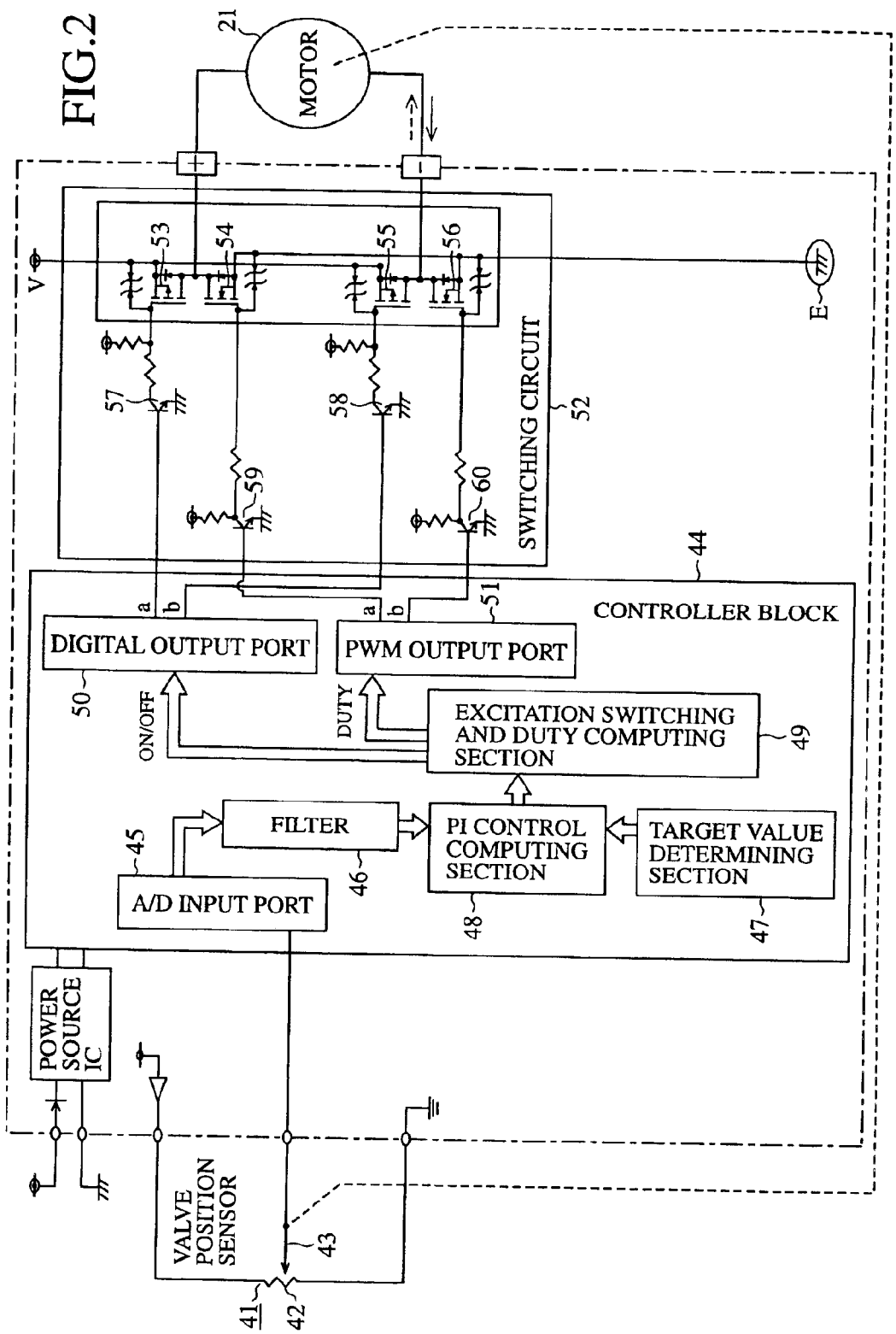
FIG. 2 is a control circuit diagram of a DC brush motor.
Figure 3:
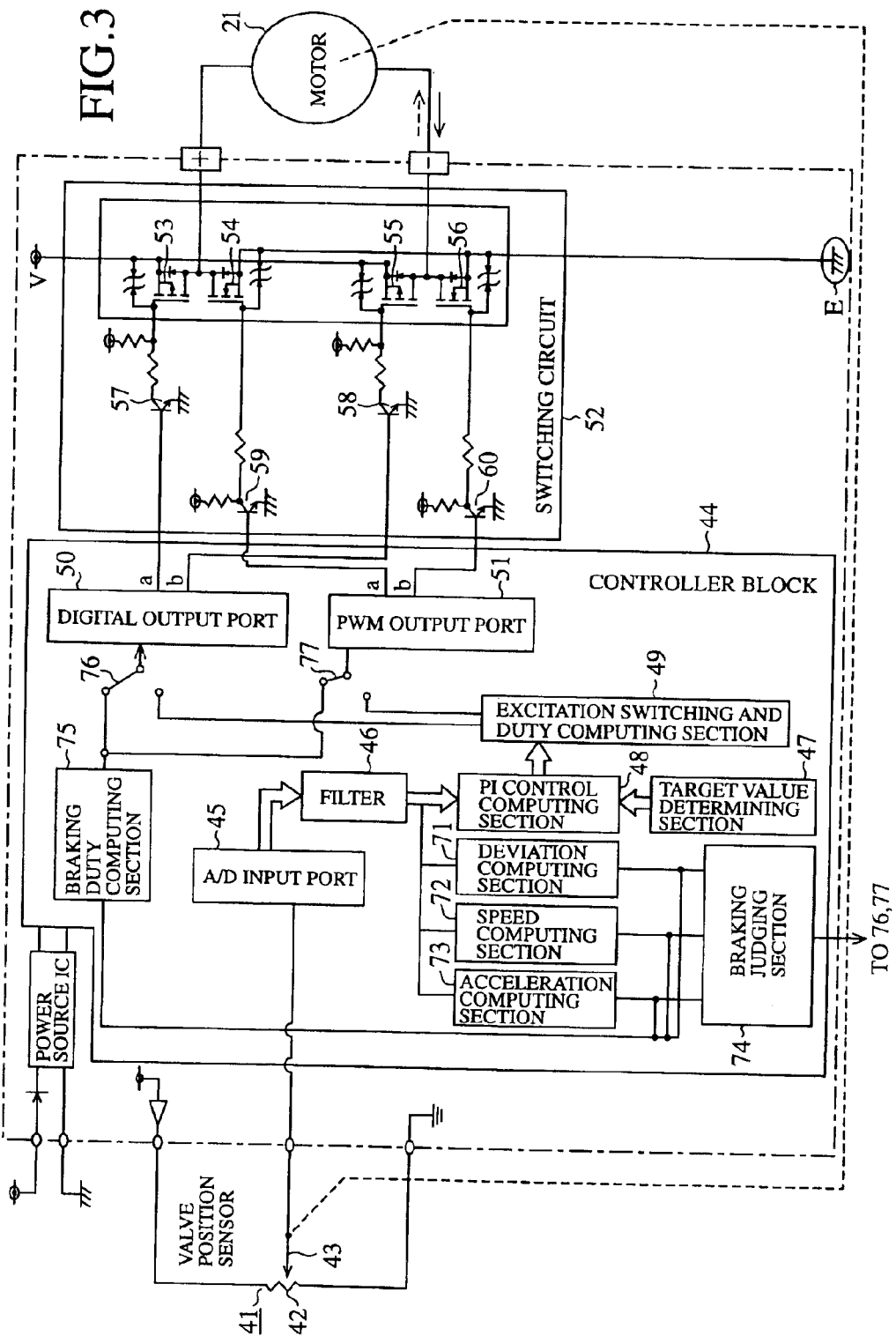
FIG. 3 is a circuit diagram to show a braking device of a DC brush motor in accordance with an embodiment 1 of the invention.

FIG. 3 is a circuit diagram to show a braking device of a DC brush motor in accordance with embodiment 1 of the invention. A reference numeral 71 denotes a deviation computing section for determining a deviation based on a present position from a filter 46 and a target value from a target value determining section 47, 72 denotes a speed computing section for determining a speed from an amount of displacement per means of time, 73 denotes an acceleration computing section for determining an acceleration from a present speed and a previous speed, 74 denotes a braking judging section (braking means) which has computation results inputted from the deviation computing section 71, the speed computing section 72 and the acceleration computing section 73 to thereby judge a start of braking and an end of braking, 75 denotes a braking duty computing section which has computation results inputted from the deviation computing section 71, the speed computing section 72 and the acceleration computing section 73 to thereby determine a duty at a time of braking, 76 and 77 denote circuit changing switches for switching between +an output of the excitation switching and duty computing section 49 and an output of the braking duty computing section 75 based on an output of the braking judging section 74. The other constitution is the same as the above mentioned constitution shown in FIG. 2, so the same parts are denoted by the same reference symbols and their repeated descriptions will be omitted.

Figure 4:
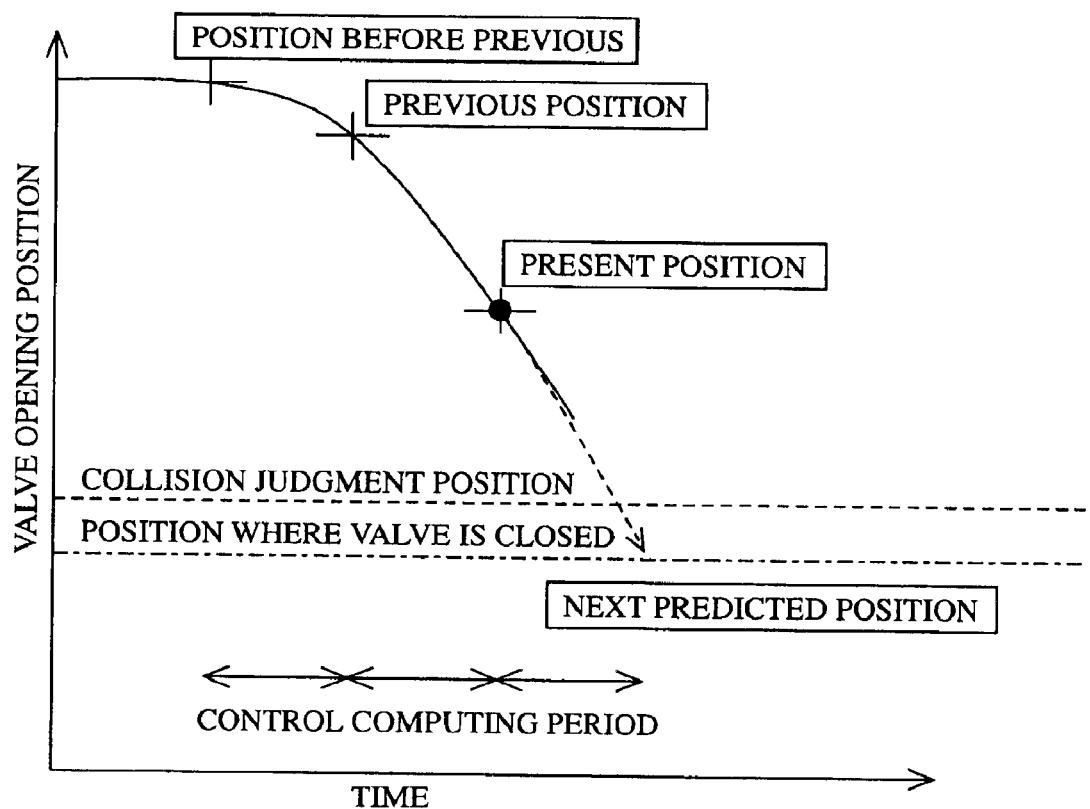
FIG. 4 is a characteristic diagram to show a basic action when a valve is closed.

FIG. 4 is a characteristic diagram to show a basic action when a valve is closed.

A start of the braking in the above mentioned braking judging section 74 is computed by means of the following equation.

Present position < position where valve is to be closed − speed − acceleration + braking judging constant where
speed=present position−previous position
acceleration=present speed−previous speed
braking judging constant=speed+acceleration<−braking judging speed
(braking judging speed is a judgment speed for judging whether or not braking is applied, which is determined by an experiment)

Moreover, the end of braking in the above mentioned braking judging section 74 is computed by means of the following equation.

Present Position ≦ target position or continuation of a state of braking > number of settings where
the number of settings is previously determined by an experiment.

Moreover, the braking duty in the above mentioned braking duty computing section 75 is computed by means of the following equation.

1−(present position−target value)*braking coefficient 1−(speed+ acceleration−braking speed)*braking coefficient 2 where
the braking coefficient 1 is previously determined by an experiment
and the braking coefficient 2 is previously determined by an experiment Next, an operation will be described.

When a target value is determined by the target value determining section 47, the PI control computing section 48 performs the PI control computation based on a present value, detected by the position sensor 41 and inputted via the A/D input port 45 and the counter 46, and the above mentioned target value, and the excitation switching and duty computing section 49 performs the excitation duty computation based on the computation results.

The digital output port 50 outputs an ON signal to terminal a and terminal b based on the output of the excitation switching and duty computing section 49 to bring the switch device 53 into conduction via the transistor 57, for example, to thereby connect the (+) terminal of the DC motor 21 to a power applying terminal V. On the other hand, the PWM output port 51 outputs a PWM signal to the terminal a and terminal b based on the output of the excitation switching and duty computing section 49 to control the conduction of the switch device 56 via the transistor 60, for example, to thereby pass a current in a direction shown by a solid line arrow through the DC motor 21.

In this manner, the DC motor 21 is operated, the motor shaft 29 is moved down by the rotation of its rotor 23, and by this moving down motion, the valve shaft 13 is moved in the same direction against the return spring 18 to move the control valve 11 to a target position to thereby open the control valve 11. Then, when the control valve 11 moves near to the target position and a difference between the present value and the target value becomes nearly equal to zero, an electric power required enough to hold the control valve 11 at its position against the restoring force of the return spring 18 is supplied to the DC motor 21.

Next in order to rotate the DC motor 21 in the reverse direction, for example, the switch devices 54, 55 are brought into conduction via the switch devices 58, 59, to pass a current in a direction shown by a dotted line arrow through the DC motor 21 to thereby rotate the rotor 23 of the DC motor 21 in the reverse direction. In this manner, the motor shaft 29 is moved upward in the drawing, and the valve shaft 13 follows this movement and is moved by the urging force of the return spring 18 to thereby move the control valve in a direction that closes the valve.

Figures 5, 6:
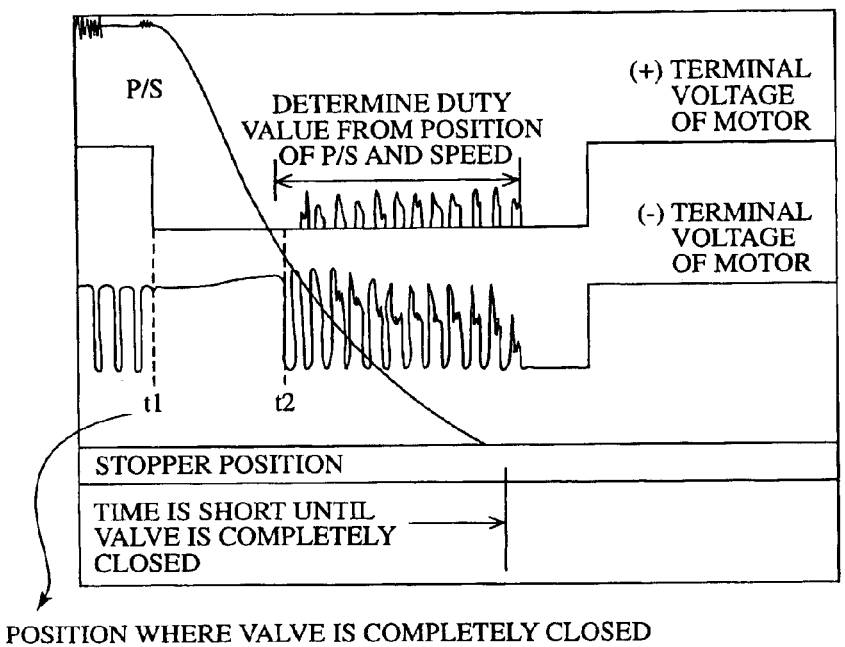
FIG. 5 is a characteristic diagram to show an action when a valve is closed in accordance with the embodiment 1 of the invention.
FIG. 6 is a diagram to show the generation of a braking force by a combination of ON/OFF of a switch device.

In the above mentioned valve closing operation, the braking judging section 74 judges a braking start position based on the above mentioned equations and switches the circuit changing switches 76, 77 to a side of braking duty computing section 75 at a point t2 in FIG. 5 according to its judgment signal, to bring a state of operation of the motor terminal, shown in FIG. 6, by the duty output from the braking duty computing section 75, whereby the DC motor 21 is short circuited to thereby apply a regenerative braking. That is, when the DC motor 21 continues to be rotated by an inertia of the rotation up to that time with the DC motor 21 short circuited, the DC motor 21 becomes a generator and passes a current produced by its generated electric power through the short circuited circuit to consume heat to thereby apply the regenerative braking.

As a result of this, the valve shaft 13 that is being rapidly moved in the direction to close the valve from a point t1 to a point t2 shown in FIG. 5, by the reverse rotation of the DC motor 21 becomes to move slowly after the point t2 to a position where the valve is completely closed because the rotation of the DC motor 21 is slowed down by a duty driving, which can prevent the motor shaft 29 from colliding with the stopper S.

Moreover, the above mentioned braking judging section 74 detects the position of the motor shaft 29 of the DC motor 21 in the direction to close the valve from an output of the position sensor 41, and determines the present position, the rotational speed and the acceleration of the motor, and the like based on this detection signal, and predicts a position at a time of the next control computation, and if the next predicted position exceeds a collision judgment position (which is obtained by adding a prediction error and a deceleration distance to a position where the valve is to be closed) shown in FIG. 4, judges that a braking is to be started at the present position where the position is predicted. Here, the next predicted position is determined by the following equation.

Next Predicted Position=present position+(rotational speed of motor+acceleration*computation period)*computation period As described above, according to this embodiment 1, it is possible to reduce the motor shaft 29 colliding with the stopper S at a motor stop position and to stop the motor shaft 29 quickly.

Moreover, by varying a braking force according to the duty output from the braking duty control computing section, which is a kind of PWM control, and by increasing the braking force (by increasing the regenerative braking by decreasing the duty output) when the rotational speed of the DC motor 21 is high, it is possible to perform the braking of the DC motor 21 smoothly.

Further, when the motor shaft 29 goes over the target position on a valve closing side, the braking is stopped and thus the motor shaft 29 can be stably returned to the target position and stopped there.

Still further, when the next predicted position goes over the collision judgment position, by starting the braking at the present position where this judgment is made, it is possible to make the start of the braking appropriate and thus to return the motor shaft 29 stably to the target position and to stop it there.

Embodiment 2

Figure 7:
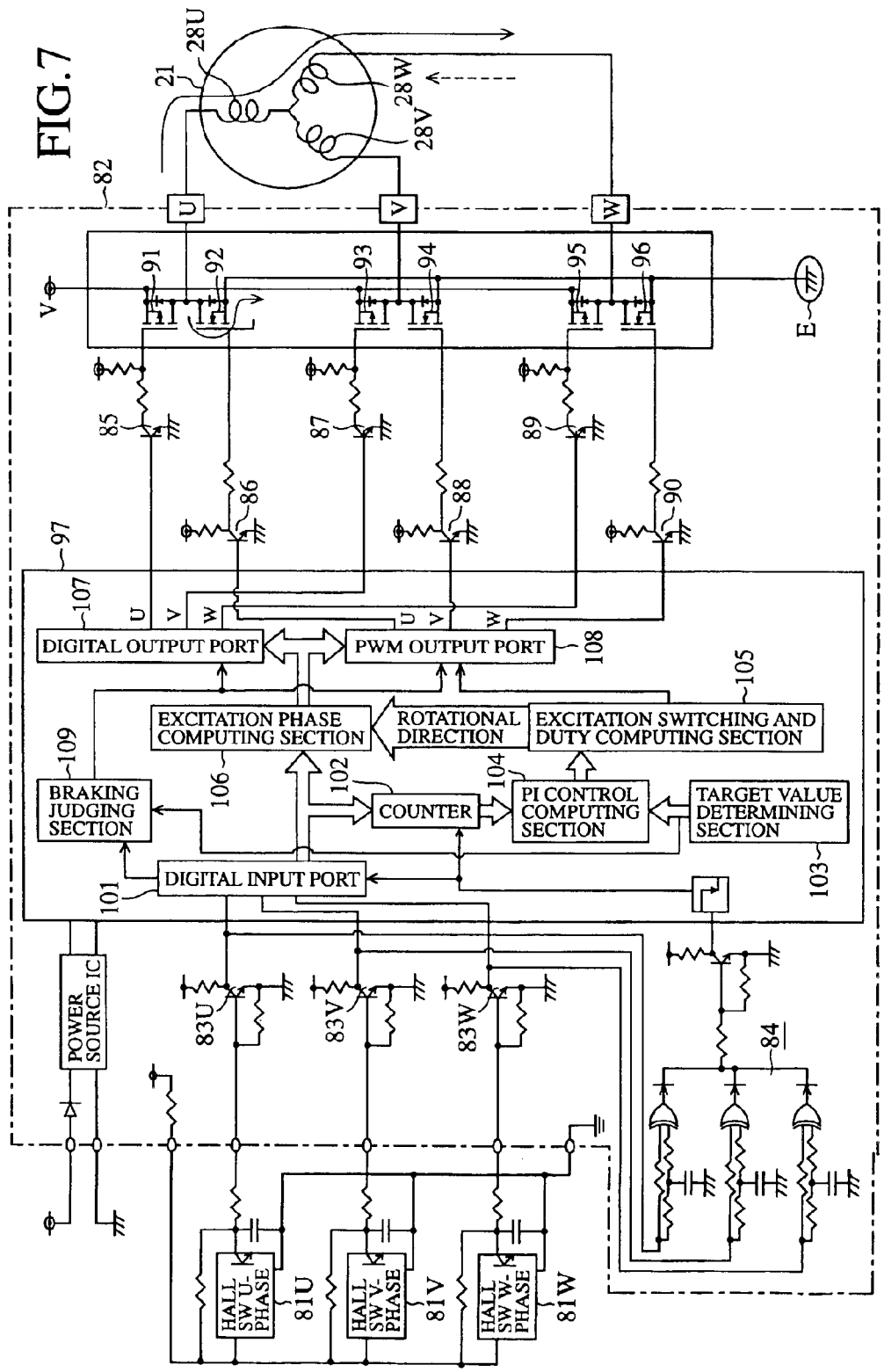
FIG. 7 is a circuit diagram to show a braking device of a DC brushless motor in accordance with an embodiment 2 of the invention.

FIG. 7 is a circuit diagram to show a braking device of a brushless DC motor in accordance with embodiment 2 of the invention, and the braking device has hall devices 81U, 81V, 81W for detecting a position of the rotor 23 and a switching unit 82 including a group of transistors receiving the signals of the hall devices 81U, 81V, 81W for switching the passing of a current through coils 28U, 28V, 28W, and passes a current through the coils 28U, 28V, 28W in sequence to rotate the above mentioned rotor 23 in a given direction.

The above mentioned switching unit 82 has switching devices 83U, 83V, 83W (hereinafter referred to as switch device) each of which receives the output signal from the hall devices 81U, 81V, 81W and is brought into conduction; an interrupting section 84 that receives the output signals of the switch devices 83U, 83V, 83W and outputs an interrupting signal; a signal processing block 97 that receives and processes the output signals of the above mentioned hall devices 81U, 81V, 81W based on the output signal of the interrupting section 84; switch devices 85 to 90 each of which receives the output signal of the signal processing block 97 and is to be brought into conduction; and switch devices 91 to 96 connected in series, each of which has one end of each of the coils 28U, 28V, 28W connected to each connection middle point and changes a state of conduction based on the output signal of each of the switch devices 85 to 90.

The above mentioned signal processing block 97 has a digital input port 101 which has the output signal of the hall devices 81U, 81V, 81W inputted; a counter 102 for reading an output of the digital input port 101; a PI control computing section 104 for performing a PI control computation based on the output signal of the counter 102 and the output signal of a target value determining section 103; an excitation switching and duty computing section 105 for performing an excitation duty computation; an excitation phase computing section 106 for computing an excitation phase based on the output signal of the excitation switching and duty computing section 105 and the output of the digital input port 101; a digital output port 107 for outputting an ON signal based on the output signal of the excitation phase computing section 106; and a PWM output port 108 for outputting a PWM signal based on the out put signal of the excitation phase computing section 106. A reference numeral 109 denotes a braking judging section for judging a start of braking and an end of braking from an input value from the digital input port 101 and a target value from the target value determining section 103.

Next, an operation will be described.

The target value determining section 103 determines a target value. When the output signal of the hall devices 81U, 81V, 81W that detects the position of the rotor 23 brings any one of the switch devices 83U, 83V, 83W into conduction, by means of the output signal from the interrupting section 84 receiving its conduction signal, the digital port 101 and the counter 102 start receiving an input signal.

The PI control computing section 104 performs the PI control computation based on a present value inputted via the counter 102 and the target value from the target value determining section 103, and the excitation switching and duty computing section 105 performs the excitation duty computation based on the computation result, and outputs the computation result to the excitation phase computing section 106 and the PWM output port 108.

The excitation phase computing section 106 performs an excitation phase computation based on the given result of excitation duty computation and the input signal inputted via the digital input port 101, and outputs the result of the excitation phase computation to the digital output port 107 and the PWM output port 108.

The digital output port 107 outputs an ON signal to a terminal U, for example, based on the output signal of the excitation phase computing section 106, to thereby bring the switch device 91 into conduction via the switch device 85 in order to connect the (+) terminal of the DC motor 21 to a power applying terminal V. On the other hand, the PWM output port 108 outputs an output signal to a terminal W, for example, based on the output signal of the excitation switching and duty computing section 105 and the excitation phase computing section 106, to thereby bring the switch device 96 into conduction via the switch device 90 in order to pass a current in a direction shown by an arrow through the DC motor 21.

In this manner, the DC motor 21 is operated and the motor shaft 29 is moved down by the rotation of its rotor 23 and the valve shaft 13 is moved in the same direction against the return spring 18 by this downward movement to thereby move the control valve 11 toward the target position. Then, the hall devices 81U, 81V, 81W detect the position of the rotating rotor 23 in sequence and switch the passing of a current through the coils 28U, 28V, 28W to rotate the rotor 23 in the same direction to move the control valve 11 near to the target position, and when the difference between the present value and the target value becomes nearly equal to zero, an electric power required to hold the control valve 11 at its position against the restoring force of the return spring 18 is supplied to the DC motor 21.

Then, a current in a direction shown by a dotted line arrow is passed through the DC motor 21 by an output of the digital output port 107 and the PWM output port 108 to rotate the rotor 23 of the DC motor 21 in the reverse direction. In this manner, the motor shaft 29 is moved up in the drawing and the valve shaft 13 follows this movement and is moved up by the urging force of the return spring 18 to move the control valve 11 in the direction that closes the valve.

Figure 8:
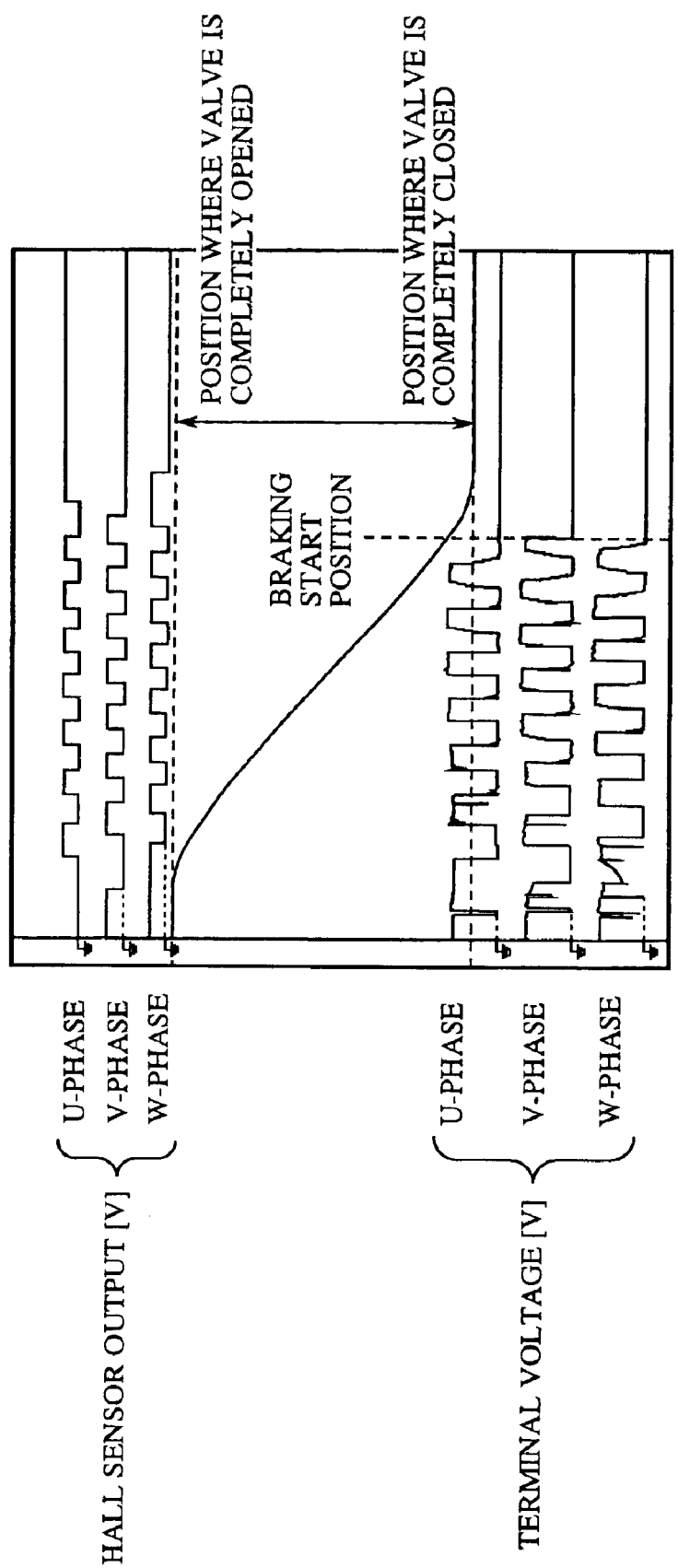
FIG. 8 is a characteristic diagram to show an action when a valve is closed in accordance with the embodiment 2 of the invention.

In the above mentioned valve closing action the braking judging section 109 as described above judges the braking start position and controls the digital output port 107 and the PWM output port 108 by means of the judgment signal, as shown in FIG. 8, to drive all the terminals U, V, W to LOW sides, which in turn moves the control valve 11 gradually to a position where the valve is completely closed while applying the braking to make the motor shaft 29 abut against the stopper S to stop it.

As described above, according to the embodiment 2, it is possible to make the motor shaft 29 abut against the stopper softly with no impact without applying a hard braking and to stop it, as is the case with the embodiment 1 described above.

Industrial Applicability

As described above, a braking device of a DC motor in accordance with the present invention is suitable for stopping a driven body urged in a direction of a stopper against which the driven body is made to a but by an urging member without making it collide with the stopper.

What is claimed is:

1. A braking device of a DC motor of the type in which a motor shaft is made to abut against a stopper at a target position thereby being stopped and held, characterized by comprising:

a position detecting means for detecting a position of the motor shaft;

a rotational speed detecting means for detecting a rotational speed of the motor; and a braking means to determines a start and an end of braking based on the rotational speed detected by the rotational speed detecting means and a deviation between a present position and the target position detected by the position detecting means; and a braking duty computing means to determine a braking duty based on the rotational speed detected by the rotational speed detecting means and the deviation between the present position and the target position detected by the position detecting means.

2. The braking device of a DC motor according to claim 1, wherein said braking means comprises a braking force varying means to vary a braking force.

3. The braking device of a DC motor according to claim 2, wherein a PWM control is used in the varying means to vary the braking force.

4. The braking device of a DC motor according to claim 3, wherein the braking force by the PWM control is increased when the rotational speed of the motor is high.

5. The braking device of a DC motor according to claim 1, wherein the breaking means generates a braking force by short circuiting said DC motor to apply a regenerative braking.

6. The braking device of a DC motor according to claim 1, wherein a position at a time of next computation is predicted by the present position of the motor shaft and the rotational speed and an acceleration of the motor and the start of braking is determined.

7. The braking device of a DC motor according to claim 1, wherein braking is stopped when the motor shaft passes the target position.

8. The braking device of a DC motor according to claim 1, wherein the start of braking can be varied.

* * * * *